(12) United States Patent
Smadja et al.

(10) Patent No.: US 9,935,954 B2
(45) Date of Patent: Apr. 3, 2018

(54) SYSTEM AND METHOD FOR SECURING MACHINE-TO-MACHINE COMMUNICATIONS

(71) Applicant: GEMALTO SA, Meudon (FR)

(72) Inventors: Philippe Smadja, Meudon (FR); Julien Delsuc, Meudon (FR); Herve Ganem, Meudon (FR); Francois Ennesser, Meudon (FR)

(73) Assignee: GEMALTO SA, Meudon (FR)

( * ) Notice: Subject to any disclaimer, the term of this patent is extended or adjusted under 35 U.S.C. 154(b) by 147 days.

(21) Appl. No.: 15/109,401

(22) PCT Filed: Nov. 28, 2014

(86) PCT No.: PCT/EP2014/075990
§ 371 (c)(1),
(2) Date: Jun. 30, 2016

(87) PCT Pub. No.: WO2015/101451
PCT Pub. Date: Jul. 9, 2015

(65) Prior Publication Data
US 2016/0337354 A1   Nov. 17, 2016

(30) Foreign Application Priority Data
Dec. 31, 2013 (EP) ..................... 13306900

(51) Int. Cl.
*H04L 29/06* (2006.01)
*H04W 4/00* (2018.01)
*H04W 12/06* (2009.01)

(52) U.S. Cl.
CPC ...... *H04L 63/0884* (2013.01); *H04L 63/0428* (2013.01); *H04L 63/062* (2013.01); *H04W 4/005* (2013.01); *H04W 12/06* (2013.01)

(58) Field of Classification Search
None
See application file for complete search history.

(56) References Cited

U.S. PATENT DOCUMENTS

| 2003/0005117 A1* | 1/2003 | Kang | ..................... H04L 63/08 |
| | | | 709/225 |
| 2009/0182919 A1* | 7/2009 | Chang | ................. G06F 13/4291 |
| | | | 710/106 |

(Continued)

FOREIGN PATENT DOCUMENTS

WO   WO2011163561 A1   12/2011

OTHER PUBLICATIONS

PCT/EP2014/075990, International Search Report, dated Mar. 30, 2015, European Patent Office, P.B. 5818 Patentlaan 2 NL—2280 HV Rijswijk.

(Continued)

*Primary Examiner* — William J. Goodchild
(74) *Attorney, Agent, or Firm* — Pehr B. Jansson; The Jansson Firm

(57) ABSTRACT

This invention concerns the implementation of end-to-end security for the communication between objects in the domain of the Internet of Things (or Internet of Objects). The purpose of the patent is dealing with the setup of secure authorized information channel between data source (M2M device) and data consumers (consumer entity). According to the present invention, the access to a M2M device by a consumer entity (consumer application) is controlled by a M2M authorization server. The M2M authorization server is the entity in charge of managing access rights for the M2M device and makes the decision regarding the access to the resource by the consumer entity (consumer application). The M2M server is an entity that enforces the decision and enables the access to the M2M device. When a consumer application needs to communicate with a M2M device, the (Continued)

present invention proposes a method for authorizing a consumer application to access a M2M device and for encrypting the communication between the consumer application and the M2M device. The M2M authorization server computes security credentials which are sent to the consumer application.

20 Claims, 3 Drawing Sheets

(56) References Cited

U.S. PATENT DOCUMENTS

| | | | |
|---|---|---|---|
| 2010/0076835 A1* | 3/2010 | Silverman | G06Q 10/06 705/14.33 |
| 2010/0100945 A1* | 4/2010 | Ozzie | G06F 21/35 726/5 |
| 2012/0159167 A1 | 6/2012 | Lee et al. | |

OTHER PUBLICATIONS

PCT/EP2014/075990,Written Opinion of the International Searching Authority, dated Mar. 30, 2015, European Patent Office, P.B. 5818 Patentlaan 2 NL—2280 HV Rijswijk.

* cited by examiner

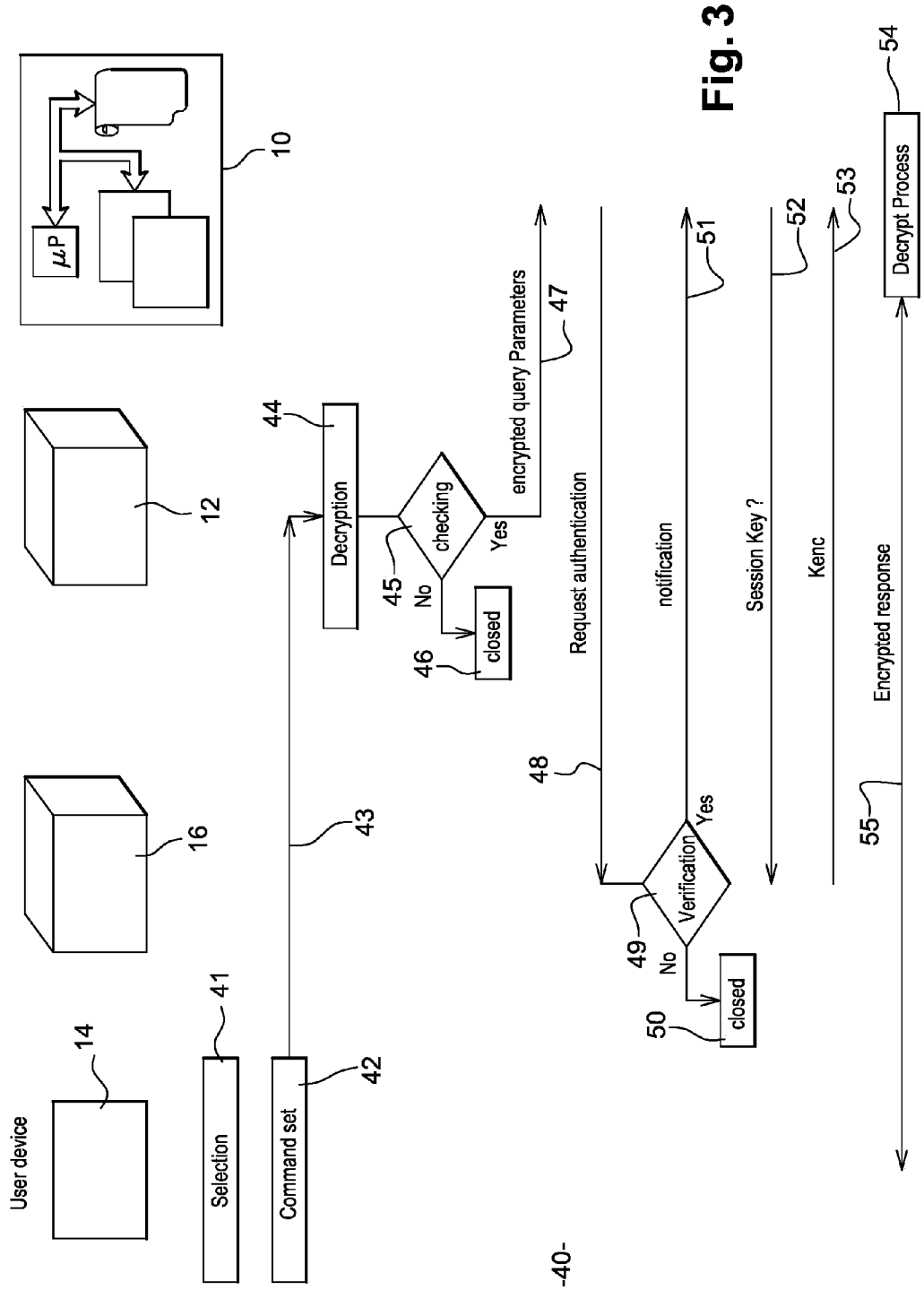

SYSTEM AND METHOD FOR SECURING MACHINE-TO-MACHINE COMMUNICATIONS

TECHNICAL FIELD

The present invention generally relates to systems and methods for securing communications in the Internet of Things.

Particularly, the present invention relates to a method and system for securing access to resources in the Internet of things.

BACKGROUND ART

Many new applications have begun to emerge with the expanding deployment of cellular network infrastructure. The machine-to-machine (M2M) market is one specific segment that has gained considerable widespread usage. This fast-growing market is predicted to see billions of machines interconnected in a near future.

A typical M2M system comprises a M2M device, an M2M server, a network part (including logical function entities such as a network element of an access network, a network element of a core network, . . . ). The M2M server stores related data information of M2M devices or groups for providing M2M services. For example, the M2M device is a water or electricity meters, and the M2M server is a reading and processing server for the water or electricity meter, which stores the configuration information of the water or electricity meter and processes the data read from the meters accordingly.

M2M devices differ from other ordinary network subscribers primarily with respect to data usage; M2M devices typically are not flexibly accessed or programmed; and their software is not written to operate with the wide variety of services that a human subscriber can handle.

In today's M2M system, the data generated by the M2M device can be sent to a M2M server directly via the network. In another embodiment, the data generated by the M2M device is sent to the M2M server through a M2M gateway. Once the data has reached the M2M server, it can be made available or distributed to other consumer entities (referred to as resource consumers) such as connected actuators or data processors.

A drawback to the aforementioned M2M architecture is that there are several potential security risks. Indeed, M2M devices which are placed in unprotected publicly accessible locations may be fraudulently modified or otherwise tampered with. Corrupted terminals may be used to attack the M2M system and/or the network. Perpetrators of such fraud may target an M2M user (e.g. via denial of service attacks, man-in-the-middle attacks, message blocking, etc.), and/or the Public Land Mobile Network (PLMN) operators (e.g., via theft of service, etc.). Furthermore, unlike personally owned terminals, the unsupervised nature of M2M devices complicates the detection and reporting of fraudulent usage or modification.

Once the data generated by the M2M device has reached the M2M server, it can be made available or distributed to other destination entities (referred to as resource consumer applications) such as data processors.

The architecture for M2M system implies two distinct communication channels, typically associated to different credentials: one from the object to the M2M server and another from the M2M server to a destination entity, in consequence there is no end-to-end security between the destination entities and the source of the data (the M2M device). The architecture is typically the following where there are two communications hops protected by different credentials. The data is revealed at M2M server and can be published to other entities.

In this case the M2M server can be hacked and/or used in fraudulent way to track user data. In the case where the M2M server is operated by a third party M2M Service provider (as standardized by ETSI TC M2M or the oneM2M Partnership), this service provider has to be trusted by the M2M application for manipulating unencrypted data that may be confidential or private.

There is a need for an end-to-end security for machine-to-machine communications. Specifically, there is a need to protect the data transmitted between a M2M device to a destination entity through a M2M server.

SUMMARY OF THE INVENTION

The following summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The present invention addresses the aforementioned security drawbacks of the M2M architecture. The present invention relates to a system and method for securing M2M communications. Particularly, the present invention relates to method and system for protecting the data transiting between M2M device (in general source application) and a destination entity (consumer application), over a possible unsecure or untrusted network.

This invention concerns the implementation of end-to-end security for the communication between objects in the domain of the Internet of Things (or Internet of Objects). The purpose of the patent is dealing with the setup of secure authorized information channel between data source (M2M device, source application or object) and data consumers (destination entity, consumer application).

According to the present invention, the access to a M2M device (in general source application) by a destination entity (consumer application) is controlled by a M2M authorization server. The M2M authorization server is the entity in charge of managing access rights for the M2M device and makes the decision regarding the access to the resource by the destination entity. Through the M2M authorization server, the user, will set the policies regarding access to the resource of the M2M device and will provide consent for the destination entity to access the resource.

The M2M server is enforcing the decisions made by the M2M authorization server and granting/denying access to the destination entity. In the present invention, the M2M server plays the role of Policy Enforcer and Data-Access Enabler that preferably has no access to clear M2M device data (source application data). The data transferred through the M2M server is encrypted between the consumer application and the M2M device—this enables end-to-end security between consumer application and M2M device (source application). The security can be strengthened by the establishment of a secure communication channel between the M2M device and the M2M server and another secure communication channel between the M2M server and the consumer application.

When a consumer application needs to communicate with a M2M device, the present invention proposes a method for securing the data transferred between the consumer application and the M2M device (in general source application). For that, the present invention proposes a method for encrypting and authorizing the communication between the consumer application and the M2M device by using the M2M server running as Data Access Enabler and Policy Enforcer.

When the consumer application wants to receive credentials for accessing the M2M device, it authenticates to the M2M authorization server. When the authentication is successful, the M2M authorization server computes an access token and computes or generates session keys and an authentication key. The access token, the authentication key and the session keys are sent to the consumer application.

When the consumer application wants to access data of the M2M device, it computes an authentication data using the authentication key and sends the access token and the authentication data to the M2M server, the M2M server checks the access token and uses the authentication data to verify if the consumer application is a valid one (Policy enforcement). The M2M server also performs an anti-replay management. If all verifications are successful, the M2M server returns the requested encrypted data.

Aspects of the embodiments of the present invention relate in general to a method of generating an encryption session keys. This session keys can be generated according to the following steps:

when a M2M consumer application received a request to communicate with a M2M device, the consumer application generates a unique session data (preferably a random data), the consumer application requests securities credentials from the M2M authorization server, this request comprising the cryptographic data computed over the generated unique session data, at reception of this request, the M2M authorization server returns security credentials. The security credentials can comprise the session keys, an authentication key and an access token. The access token can comprise the cryptographic data and in some embodiments the indexes of the session keys and—in some other embodiments the session keys is encrypted with a M2M device key shared between the M2M Authorization Server and the M2M Device. The content of the access token may be encrypted by the M2M authorization server.

at reception, the consumer application elaborates an authentication message comprising the unique session data and a consumer request counter which are encrypted with the authentication key. This authentication message and the access token are sent to the M2M server.

at reception, the M2M server, in case the access token is encrypted decrypts the content of access token using the related algorithm with the corresponding key. If the access token is not encrypted, the request to the M2M server may be transported over secure channel like SSL/TLS. From the authentication key of the (decrypted) access token, the M2M server decrypts the authentication message. From the decrypted authentication message, the M2M server recomputes the cryptographic data of the unique session data and compares it against the cryptographic data of the access token. As only the consumer application has the knowledge of the unique session data, this comparison allows to the M2M server to be confident that the consumer application is endorsed by the security system.

The M2M server can be able to check authenticity of the access token either by verifying a signature of the access token generated by the M2M authorization server or by verifying in the access token some authentication data shared between the M2M authorization server and the M2M server or by accessing the M2M authorization server.

The M2M server checks that the consumer request counter of the decrypted authentication message is greater than the previous stored one into the M2M server database (anti-replay management). If successful, it stores the new consumer request counter associated to the access token in its database.

Optionally, the M2M server may enforce its decision by authenticating to M2M authorization server. In this case, the M2M server requests a validation of the access token by the M2M authorization server.

All these verifications performed allow to the M2M server to know that the consumer application is authorized to access to the resource of the M2M device. With this way, the M2M server does not need to have knowledge of authorized consumer applications; it delegates this management to the M2M authorization server. Next, the M2M server either returns back already received encrypted Device data or forwards the request to the M2M Device.

When the M2M device receives a request from the consumer application through the M2M Server to access to its resources, the M2M device retrieves the session keys corresponding to the request. In an embodiment, the M2M device receives from the M2M server the session keys encrypted with a M2M device key (shared between the M2M authorization server and the M2M device). The M2M device decrypts the session keys. In another embodiment, the M2M device receives the identifiers of the session keys, in this case, the M2M device can authenticate to the M2M authorization server and requests the session keys to the M2M authorization server; if the authentication of the M2M device is successful, the M2M authorization server returns the session keys.

The M2M device decrypts the access request, processes the request, elaborates a corresponding response, encrypts the response with the session keys and returns the encrypted response to the consumer application through the M2M Server. The M2M device may also asynchronously push ciphered data to the M2M server.

In case, the M2M Device has no possibility to securely connect to the M2M Authorization Server—for any reason—or the M2M device cannot be configured for setting the key used to encrypt the session keys, the M2M Server itself can play the role of the M2M device vis-à-vis the M2M Authorization Server to retrieve the session keys from the M2M authorization or decrypt the encrypted session keys within this M2M server encryption key of the session keys. On completion, the M2M server decrypts the request and encrypts the response. In this case, the end-to-end security is partial because the M2M Server has to obtain and manage clear data from the M2M device. However, this situation is quite common for instance when the M2M server is a gateway that enables connectivity between WAN and LAN and when the M2M device cannot be configured to securely authenticate to the M2M Authorization Server. It is also the case when the M2M Server has to perform operations on M2M device data (aggregation of multi sources, etc. . . . )

The present invention such described herein allows performing security between a consumer application and the M2M device. The M2M server is an entity that enables access to resource and enforces security policy without having any information about the calling consumer application and without having any information about the requester. This enables delegation of authorization to external trusted entity (the M2M authorization server).

With the present invention, only authorized consumer applications are entitled to securely access the M2M server for Policy Enforcement and the M2M device for data encryption. The M2M server and M2M Device do not encompass any user information but delegate user management and access control to external M2M authorization server. The M2M server and M2M Device do not encompass any knowledge about calling consumer application but delegate consumer application management and access control to external authorization server. Such systems and methods of the present invention improve the security of information transferred between a consumer application and a M2M device by providing efficient means for secure communication channel.

The present invention concerns the implementation of end-to-end security for the communication between objects in the domain of the Internet of Things (or Internet of Objects). The purpose of the patent is dealing with the setup of secure authorized information channel between data source (M2M device) and data consumers (consumer entity). According to the present invention, the access to a M2M device by a consumer entity (consumer application) is controlled by a M2M authorization server. The M2M authorization server is the entity in charge of managing access rights for the M2M device and makes the decision regarding the access to the resource by the consumer entity (consumer application). The M2M server is an entity that enforces the decision and enables the access to the M2M device. When a consumer application needs to communicate with a M2M device, the present invention proposes a method for authorizing a consumer application to access a M2M device and for encrypting the communication between the consumer application and the M2M device. The M2M authorization server computes security credentials which are sent to the consumer application. The consumer application accesses the M2M server for retrieving the M2M device resource. The M2M server enforces the decision of the M2M authorization server by checking the access request, and on success accesses the M2M device (or in some embodiments the M2M Server itself). The M2M device securely retrieves the request encryption key and response encryption key either by decrypting the received encrypted session keys or by securely accessing the M2M authorization server. The M2M device is providing the encrypted data to the M2M server for further delivery to the consumer application.

To achieve those and other advantages, and in accordance with the purpose of the invention as embodied and broadly described, the invention proposes a method A method for securing machine-to-machine communications between a M2M consumer application and a M2M resource provider wherein when an access request is initiated:

sending a securities credentials request from the consumer application to a M2M authorization server,
receiving from the M2M authorization server to the consumer application generated securities credentials which comprises an access token, session encryption keys and an authentication key,
transmitting from the M2M consumer application the access token and an authentication message to the M2M resource provider for authenticating the consumer application,
transmitting the access request from the consumer application to the M2M resource provider, said access request comprising request parameter encrypted with the session keys to access or control resources,
authenticating by the resource provider the consumer application as an authorized one from the authentication message and the content of the access token,
retrieving by the resource provider the session keys from the content of the access token,
decrypting by the resource provider the encrypted request parameter with the session keys
sending, from the resource provider, the encrypted response of the request parameter to the consumer application.

In another aspect of the present invention, the resource provider is a M2M device or a M2M server.

In another aspect of the present invention, the generation of the access token comprises the following steps:

generation of a session data by the consumer application, said session data uniquely identifies the current transaction between the consumer application and the resource provider,
computation of a cryptographic data from the generated session data,
adding the cryptographic data to the securities credentials request,
the access token generated by the M2M authorization server comprises the cryptographic data of the securities credentials request, information to retrieve session keys and a generated authentication key.

In another aspect of the present invention, the access token is encrypted with a key shared between the M2M authorization server and the resource provider.

In another aspect of the present invention, the information to retrieve the session keys comprise either index associated to the session keys in a database of the M2M authorization server, or encrypted session keys with a key shared between the M2M authorization server and the resource provider.

In another aspect of the present invention, the authentication of the consumer application by the resource provider comprises the following steps:

encrypting the session data with the authentication key, by the consumer application,
sending the access token and the encrypted session data from the consumer application to the M2M server,
From the authentication key of the access token, decrypting the encrypted session data,
from the decrypted session data, computing a cryptographic data,
If the comparison of the computed cryptographic data with the cryptographic data of the access token is successful, the consumer application is authenticated.

In another aspect of the present invention, the authenticity of the access token is verified by the resource provider either from a signature computed by the M2M authorization server or an authentication data added by the M2M authorization server to the access token.

In another aspect of the present invention, the authentication data comprises an incremented value of a counter which is used to perform anti replay management, the M2M resource provider verifies if the received counter value into the authentication data is greater than a previous saved counter value, if this verification is successful the M2M resource provider saves the incoming counter value and delete the previous saved.

In another aspect of the present invention:
when the authentication of the consumer application is successful, the M2M resource provider authenticates to the M2M authorization server,
If the authentication is successful, retrieving the session keys.

In another aspect of the present invention, the access request comprises also the session data encrypted with the session authentication key and the access token.

In another aspect of the present invention, a M2M device continuously encrypts data with the session keys to push it to the M2M resource provider for storage.

In another aspect of the present invention, the access token comprises the resource unique identifier (URL) and the list of authorized queries parameters by the consumer application, if the encrypted request parameter is in the list of authorized access, the encrypted query parameter is processed by the resource provider.

In another aspect of the present invention, during the authentication of the consumer application by the M2M server a lifetime of the access token is verified.

In another aspect of the present invention, when the lifetime of the access token is reached
  generation of respectively a new session data and/or a new access token,
  the session keys and/or the authentication key are renewed or maintained.

The present invention also relates to a M2M communications system, comprising a consumer application Said consumer application is configured to communicate with a M2M device through a M2M server across an access network, wherein access request messages transiting between the consumer application and the M2M device during this communication are secured by a M2M authorization server according to the method of the present invention.

BRIEF DESCRIPTION OF THE DRAWINGS

The following detailed description will be better understood with the drawings, in which:

FIG. 3 is a logic flow diagram in accordance with an exemplary embodiment of this invention during the establishment of a security process between the consumer application and a M2M device.

DETAILED DESCRIPTION OF THE EMBODIMENTS OF THE INVENTION

Figure 1:
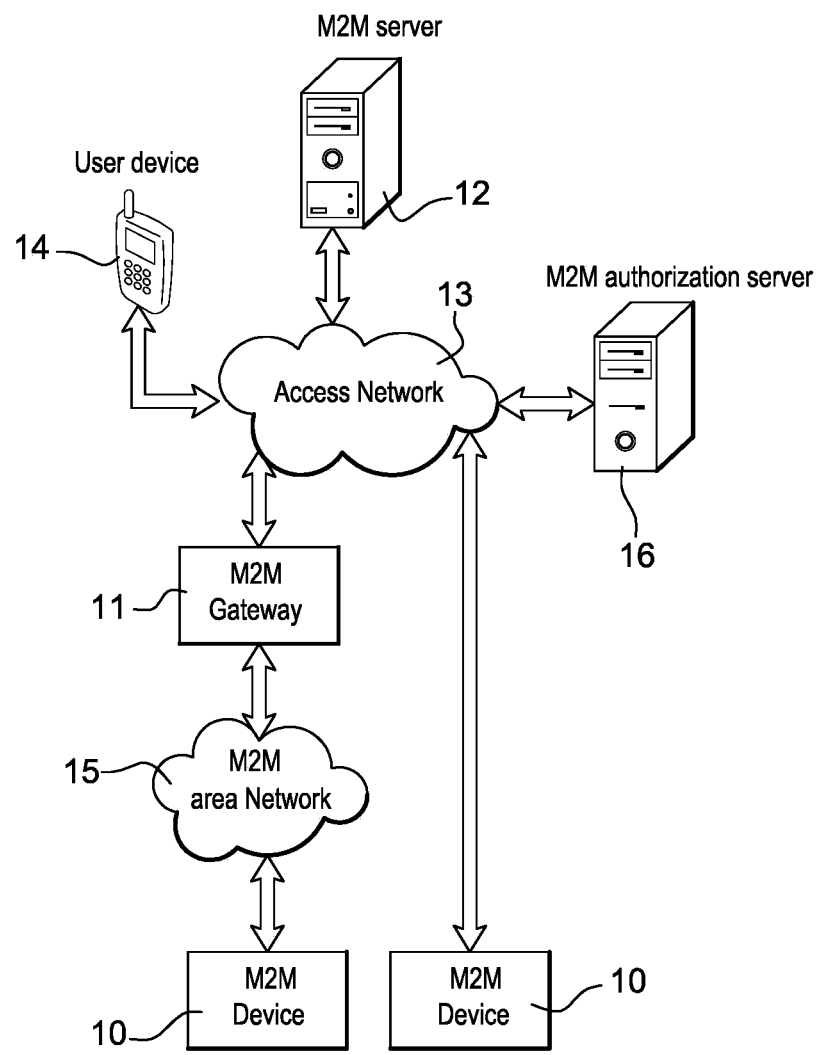
FIG. 1 illustrates the different entities involved in a security process of data transiting between a consumer application and a M2M device.

The present invention is not specific to any particular hardware or software implementation, and is at a conceptual level above specifics of implementation. It is to be understood that various other embodiments and variations of the invention may be produced without departing from the spirit or scope of the invention. The following is provided to assist in understanding the practical implementation of particular embodiments of the invention.

The same elements have been designated with the same referenced numerals in the different drawings. For clarity, only those elements and steps which are useful to the understanding of the present invention have been shown in the drawings and will be described.

Further, the mechanisms of data communication between the parties and their environment have not been detailed either, the present invention being here again compatible with usual mechanisms.

Furthermore, the connecting lines shown in the various figures contained herein are intended to represent exemplary functional relationships and/or physical couplings between the various elements. It should be noted that many alternatives or additional functional relationships or physical connections may be present in a practical system. Furthermore, the various entities in FIG. 1 may communicate via any suitable communication medium (including the Internet), using any suitable communication protocol.

Moreover, when an action is said to be performed by a device, it is in fact executed by a microprocessor in this device controlled by instruction codes recorded in a program memory on said device. An action is also assigned to a consumer application or software. This means that part of the instruction codes making up the consumer application or software are executed by the microprocessor.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Machine-to-Machine (M2M) communication is a form of data communication that involves one or more entities that do not require explicit human interaction or intervention in the process of communication. Machine-to-machine (M2M) communication enables an intelligent communication service to be safely and conveniently used between a human and an object or between an object and another object ubiquitously. Accordingly, M2M communication enables a, object (a sensor, actuator, gateway . . . ) to perform a task that can be too risky for a human to manually perform, a task that can consume a long time or a task which can require security. The M2M communication may be applied to the fields of telematics, sports, navigation, smart measuring instruments, automatic vending machines, security services and the like. M2M communications have been deployed in smart grid, home networking, health care, vehicular networking environments . . . .

An exemplary of M2M communication system in which the various exemplary embodiments described herein can be implemented is now described with respect to FIG. 1. For simplicity of discussion, only one of each entity is shown at FIG. 1. It is understood, however, that embodiments of the technology may include more than one of each entity. Additionally, some embodiments of the technology may include fewer than all of the entities shown in FIG. 1.

M2M communication system includes a plurality of objects herein named M2M devices 10. In a typical M2M communication scenario as shown in FIG. 1, data is exchanged between a M2M server 12 that executes an M2M consumer application and the M2M device 10 through an access network 13.

The M2M device 10 runs M2M consumer application(s) using M2M service capabilities and network domain functions. M2M devices 10 may connect to the access network 13 either directly or via a M2M gateway 11. A M2M area network 15 provides connectivity between M2M device 10 and the M2M gateway 11. This M2M device 10 is labeled as hidden device since they connect to the access network 13 via the M2M gateway 11.

The M2M gateway 11 runs M2M consumer application(s) using M2M service capabilities. The M2M gateway acts as a proxy between M2M devices and the access network 13. The M2M area network 15 is a network of devices for M2M communications, (e.g., ZigBee, 6lowPAN, etc.). The M2M area network 15 may be referred to as a capillary network. A local network, such as a local area network (LAN) or personal area network (PAN), etc., may form the M2M area network 15.

The M2M device 10 may be a sensor or meter which may be arranged to capture an event such as a temperature, inventory level, or other suitable parameter that is relayed to a M2M consumer application that is operative to translate the captured event into meaningful information. The M2M device 10 may be, e.g., a laptop, a smartphone, a tablet device, a utility meter, a controller of a heating, ventilation and air conditioning (HVAC) system, M2M smart meters, environment monitoring devices or a server providing data and so on.

The M2M server 12 is a computing device allowing enforcing access for a consumer application 18 to the M2M devices through the Access network 13. The M2M server 12 may comprise a database to store data from the M2M devices.

The consumer application 18 runs in a user device 14 or in a remote infrastructure. The consumer application is a consumer application getting and consuming resource on behalf of a user. As used herein, the terms "user device" may include, but are not limited to, cellular telephones, smartphones, PCs and minicomputers, whether desktop, laptop, or otherwise, as well as mobile devices such as handheld computers, PDAs, video cameras, set-top boxes, personal media devices (PMDs), M2M-enabled devices or modules, computerized cards or plug-ins, or any combinations of the foregoing.

The access network 13 can support multiple different radio access technologies. Various examples of wireless communication systems and access networks that can implement the present invention can be used. The access network 13 can refer to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

The M2M communications systems as shown in FIG. 1 comprise a M2M authorization server 16. The M2M authorization server 16 manages the security of the communication between the entities involved. The M2M authorization server 16 performs authentication of the M2M device 10 and the M2M server 12 before session establishment. The M2M authorization server 16 may perform session security related functions such as encryption of traffic by receiving security request and returning security credentials. The M2M authorization server 16 is the entity in charge of managing user access rights to a resource of the M2M device 10. The M2M authorization server 16 is also the entity in charge of making the decision regarding the access to the resource for a user 17. In an embodiment, the user has to authorize the M2M authentication server to issue the security credentials to the consumer application.

Through the M2M authorization server 16, the policies regarding access to the resource of the M2M device are set. The set up of the policies can comprise the enrolment phases to the M2M authorization server 16 for the following entities:
consumer application,
M2M device,
user, and/or
M2M server.

The policies can define the following information:
URL of the M2M server including reference of the M2M device (end point address). This resource URL shall be unique in the M2M communication,
owner (user) of the resource,
key materials defined between the M2M authorization server and the M2M server 12 and between the M2M authorization server 16 and the M2M device 10. The key materials can comprise:
shared encryption key material relevant to the M2M server 12 for encryption of the access token
either an authentication credential used to authenticate the M2M device 10 to the M2M authorization server 16 or/and an encryption key used to encrypt the session keys.
authentication credential that may be used to authenticate the M2M Server 12 to the M2M authorization server 16
key generation algorithms. The key generator algorithm is preferably a random generator. The key generation algorithms used herein are well known by the person in the art and don't need to be describe any more. The key materials are used to achieve end-to-end communication security between the consumer application 17 and the M2M device 10.

The purpose of these enrolment processes and the policies information defined is to allow the consumer application to use M2M devices exposed by the M2M server according to the defined rights.

Any suitable form of enrolment process between these entities may be implemented as one of ordinary skill would recognize.

Figure 2:
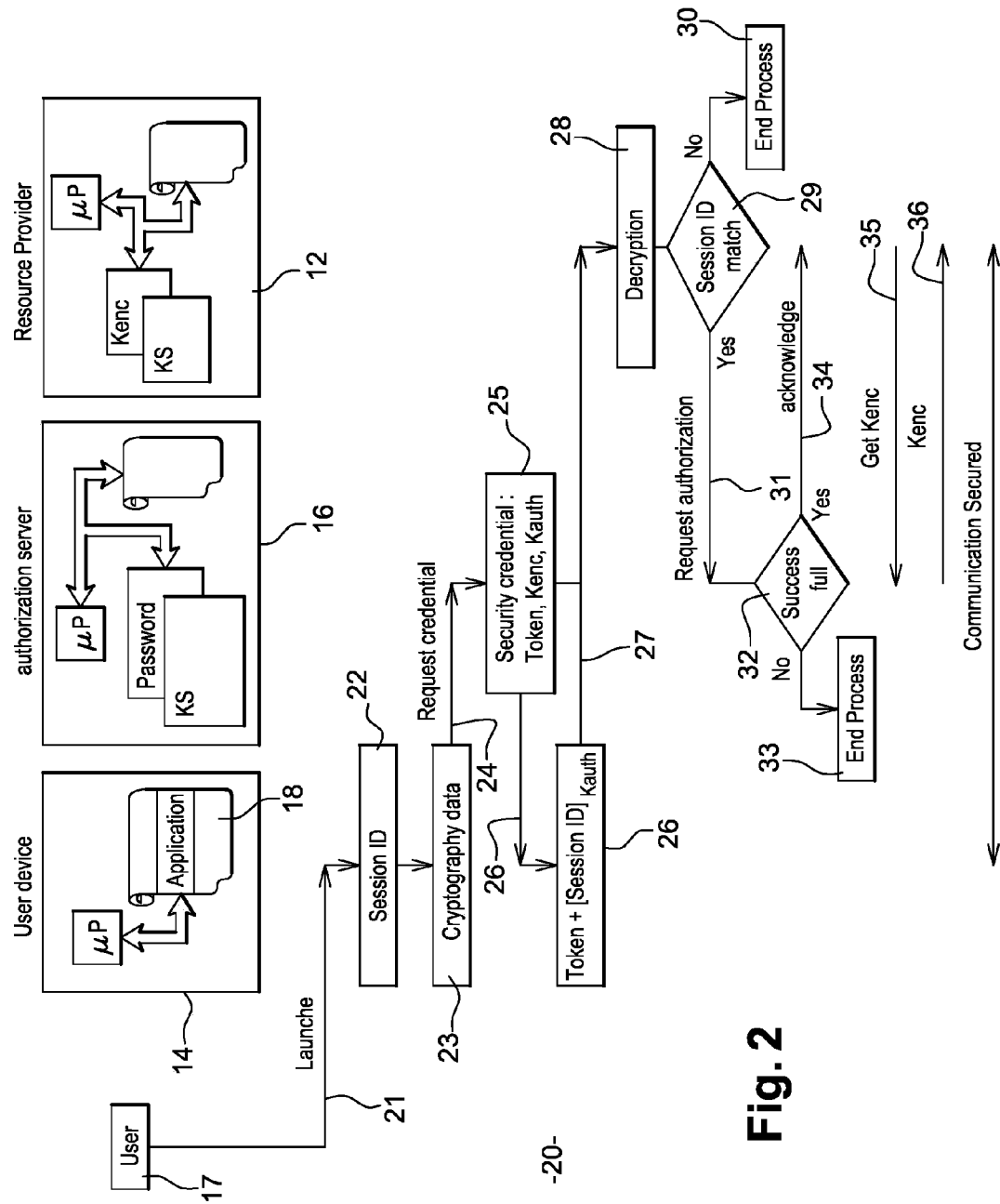
FIG. 2 is a logic flow diagram in accordance with an exemplary embodiment of this invention during the establishment of a security process between the consumer application and a M2M server.

It can be assumed that before the processes flow, as described in FIG. 2 and FIG. 3, are set up; an authentication of the user is performed by the M2M authorization server 16. That authentication step of the user is outside of scope of the present invention.

It can further be assumed that during a personalization process, a shared encryption key material $K_s$ can be created. The shared encryption key material key $K_s$ can be a symmetric key which can be derived from a master-key and a pre-defined parameter. The predefined parameter can be a unique identifier of the M2M Server. This shared key is generated by the authorization server 16 or by any trusted system. The M2M authorization server 16 shares the created shared encryption key material key $K_s$ with the M2M server 12.

In another embodiment, the shared encryption key material $K_s$ is defined by the owner of the M2M Server and entered in the M2M authorization server during the enrollment phase of the M2M server.

In another embodiment, the access token is encrypted using the public key of the M2M Server. The M2M Server will use the corresponding private key to retrieve the access token. This embodiment can be relevant when the M2M Server is able to dynamically generate key pair, request public key certificate to a certificate authority and push the certificate to the Authorization Server for registration of the public key (after validation of the M2M Server certificate).

In another embodiment, the shared key $K_s$ is null, it means that the access token is not encrypted, in this case, the communication channel between the consumer application 18 and the M2M server 12 is preferably a secure channel like TLS.

Any suitable form of generation and share of the shared key between these entities may be implemented as one of ordinary skill would recognize. The way of how the shared key $K_s$ is generated and shared between the entities is outside the scope of the present invention.

It can further be assumed that communications, between the M2M authorization server 16, the consumer application 18, the M2M device 10, an the M2M server 12 are preferably routed through a secure channel and protocol that is outside of scope of the present invention. In the embodiment where the access token is not encrypted, it is recommended to rely on a secure channel for this communication link.

In the present invention described herein, it is assumed that the encryption algorithms may use data encryption standards such as, e.g., RSA with a key of at least 1024 bits, triple data encryption standard (DES), 128-bit advanced encryption standard (AES), an RC4 stream encryption algorithm using minimum 128-bit key length, etc. Any other suitable form of encryption standards may be implemented as one of ordinary skill would recognize.

FIG. 2 illustrates an exemplary flow diagram for securing data transiting between the consumer application 18 and the M2M server 12. In this illustrated example, the M2M server plays the role of a M2M device vis-à-vis the M2M Authorization Server. In this embodiment, the M2M server is a resource provider implemented by a Gateway. The M2M server enables data transfer between the consumer application and the M2M device through the gateway. Therein, the process flow between the user 17 and the M2M server 12 is depicted with labeled arrows to which respective numbers are assigned. The flow is understood as being performed sequentially from top to bottom as indicated by the increasing numbers. However, it should be noted that there may be multiple instances of this protocol run in parallel without specified ordering.

FIG. 2 is a flow chart depicting a set of functions 20 that can be carried out in accordance with an embodiment of the present invention. The set of functions 20 can be performed to provide to the consumer application 18 and the M2M server 12 securities credential allowing securing the data transiting between the consumer application 18 and the M2M server 12. The set of functions 20 are shown within steps 21 through 37. A description of these steps now follows.

At step 21, upon receiving an input from a user to request an access to resources of the M2M devices 10, the user device 14 launches the execution of the consumer application 18. When the consumer application 18 is launched, a graphic keyboard can be displayed on the user device 14. It can comprise area selectors allowing the user 17 to enter a parameter to access or control the M2M device 10. The consumer application 18 elaborates an access request corresponding to the parameters selected by the user 17.

Then, a request for securities credentials is generated by the consumer application 18. For that, at step 22, the consumer application 18 generates a session data (SDATA). This session data is a piece of data used to authenticate the consumer application to the M2M authorization server. The session data can be often a long, randomly generated string to decrease the probability of obtaining a valid one by means of a brute-force search.

At step 23, from the SDATA generated, the consumer application 18 can compute a cryptographic data. The cryptographic data can be computed by any algorithms which prevent the retrieval of the initial information. This kind of algorithms is preferably a one way function.

In one embodiment, the cryptographic data is computed by applying hashing functions or hashing algorithms (e.g., an MD5 or SHA hash . . . ) to the SDATA. A hashing algorithm will transform the SDATA into a fixed length identifier string (often called a digest).

In another embodiment, the cryptographic data can be computed by applying a MAC (Message Authentication Code) operation, an HMAC (Hash MAC) operation or a sign operation on the session data SDATA. Those various exemplary embodiments are well known by the person skilled in the art and do not need to be described anymore.

At step 24, the consumer application 18 sends a request of the securities credentials to access to the M2M device resources. This request comprises the cryptographic data. At reception, the M2M authorization server 16 can request an authentication of the user 17 to authorize the consumer application to retrieve credentials for accessing the M2M device resources. This user authentication step is out the scope of the present invention.

In an embodiment, the consent of the user is verified by the M2M authorization server before processing the request from the consumer application 18 received at step 24. For example, the user can click on a validation form displayed on its user device and/or can enter its password to give his consent.

Upon reception of this request, at step 25, the M2M authorization server 16 generates session keys and an authentication key $K_{auth}$. The sessions keys comprise a request encryption key $K_{enc}$, and a response encryption key $K_{res}$. These keys are generated from key materials. The request encryption key $K_{enc}$ is used to protect the confidentiality of the messages sent by consumer application 18 to the M2M device 10 through the M2M server 12. The response encryption key $K_{res}$ is used to protect the confidentiality of the message sent by the M2M Device to consumer application 18. The Key $K_{auth}$ allows authenticating the consumer application 18 to the M2M server 12.

The M2M authorization server 16 stores the session keys and the authentication key $K_{auth}$ in its database. An index or an identifier is assigned to the session keys. The authorization server 16 generates also an access token associated. This access token is computed from the key materials.

In one embodiment, the content of this access token can comprise the received cryptographic data, the index associated to the request encryption key $K_{enc}$ and the index associated to the response encryption key $K_{res}$, the authentication key $K_{auth}$, a lifetime, the consumer application rights (list of authorized queries parameters to the consumer application) and the related resource identifier represented as a Uniform Resource Locator (URL). With such data, the M2M device or the M2M server is able to retrieve the session keys to the M2M authorization server.

In another embodiment, the content of this access token can comprise the received cryptographic data, the session keys material and the authentication key. The session keys material can comprise the encrypted session keys using the M2M device key. The M2M device key is shared between the M2M authorization server and the M2M device. In the embodiment illustrated in FIG. 2, the M2M server 12 acting as the M2M device shares the M2M device key with the M2M authorization server 16. In this embodiment, the M2M device does not need to connect to the M2M authorization server for retrieving the session keys; it decrypts the encrypted session keys received from the M2M authorization server.

In an embodiment, the content of the access token may be encrypted with the shared key Ks of the M2M authorization server 16 and M2M Server 12 and an encryption algorithm enabling secure decryption of the access token by the M2M server. This encryption algorithm is well known by the person skilled in the art and does not need to be described anymore.

The M2M authorization server may provide a means for the M2M server to verify the authenticity of the access token. This authenticity means can be a simple signature mechanism—the signature algorithms are well known by the person of the art and do not need to be described anymore. Another means is to add in the access token an authentication data shared between the M2M authorization server and the M2M server. This authentication data can be a secret data, a password, a passcode, a passphrase, any identification code and/or the like. Another means is to provide an access point at the M2M authorization server for verifying the access token.

The M2M authorization server 16 elaborates, at the step 25, securities credentials. These securities credentials comprise the generated access token, the session keys and the authentication key $K_{auth}$.

At step 26, the M2M authorization server 16 returns the securities credentials to the consumer application 18 in response to its request at step 24. The securities credentials are sent preferably over a secure channel to the consumer application 18.

Upon reception, the consumer application 18 computes an authentication data. This authentication data can be encrypted with authentication key $K_{auth}$. The authentication data comprises the session data used at step 23 to request the access token to the M2M authorization server and an incremented value of a consumer request counter which will be used to perform anti replay management at M2M server. The consumer application 18 encrypts the queries parameters of the access token, selected by the user 17, with the session request encryption Key $K_{enc}$.

At step 27, the consumer application 18 transmits to the M2M server 12 the access token, the authentication data and the access request.

Upon reception, the M2M server 12, at step 28, retrieves from its database the shared key Ks if the access token is encrypted and decrypts it. From the clear access token, the M2M server 12 can verify the validity of the access token (for example by verifying its lifetime). The M2M server 12 with the authentication key $K_{auth}$ extracted from the access token can decrypt the authentication data. If the verification fails, the process flow can be closed and the M2M server may notify the consumer application and/or the M2M authorization server that the data is tampered.

If on the other hand the verification is successful, the M2M server 12 may verify the integrity of the data to check that the consumer application 18 is a valid one. For that, at step 29, the M2M server computes a cryptographic data of the session data extracted from the decrypted authentication data. The M2M server 12 compares the computed cryptographic data to the cryptographic data extracted from the access token. If the verification fails, the process flow can be closed, at step 30, and the M2M server may notify the consumer application and/or the M2M authorization server that the consumer application 18 is not an authorized one. As only the consumer application knows the session data associated to the access token, the M2M Server 12 can authenticate the consumer application. Therefore the M2M Server is able to establish that the consumer application 18 is a consumer application authorized to access to the M2M services. If the verification is successful, the M2M server 12 may authenticate to the M2M authorization server 16 and passes the access token to enforce its validation of the access token (the user may have invalidated the access token at the M2M authorization server).

At step 31, to authenticate the M2M server 12, the M2M server 12 is involved to provide through a channel (preferably secure), an authorization data which is known to the sole M2M server 12 and the M2M authorization server 16. The authorization data is any identifier/indicia code suitably configured to allow an authenticated access. The authorization data can be a Personal Identification Number (or PIN), a secret data, a password, a passcode, a passphrase, a digital certificate any identification code and/or the like.

Next, upon receiving the authorization data, the authorization server 12 analyses whether the provided authorization data is the expected data. If the answer is no, i.e. when the provided data does not correspond with the expected data stored within the M2M authorization server 16, then the process flow can be closed at step 33. If the answer is yes, i.e. when the provided data corresponds with the expected data stored within the M2M authorization server 16, then the M2M authorization server 16 can notify, at step 34, to the M2M server 12 that the authentication is successful.

Next, at step 35, the M2M server 12 can send a request to the M2M authorization server to get the session keys $K_{enc}$ and $K_{res}$. This request comprises the index of the $K_{enc}$ and the index of the $K_{enc}$ of the decrypted access token. Having such indexes implies the M2M sever 12 has been able to decrypt the access token. Upon received, the M2M authorization server 12 extracts from its database the session keys associated to the related received indexes. The extracted session keys are sent, at step 36, to the M2M server 12 in response. The M2M server 12 stores in its database the received session keys to secure communications with the consumer application 18. In another embodiment, the M2M server 12 retrieves the session keys by decrypting the encrypted session keys using the M2M device key.

The M2M server 12 decrypts the content of the access token with the received session request encryption key $K_{enc}$. The decrypted request parameter is processed by the M2M server 12. In result of the processing, the M2M server 12 elaborates a response accordingly. At step 37, the M2M server 12 encrypts the response with the session response encryption key $K_{res}$. The encrypted response is sent in return to the consumer application 18 through the M2M server 12.

The process flow described in FIG. 2 builds an end-to-end security between the consumer application 18 and the M2M server 12 acting as the M2M device. The session keys $K_{enc}$ and $K_{res}$ and the authentication key $K_{auth}$ such as defined by the present invention provide a secure channel over which information can be transmitted securely through an authorized consumer application over the access network and the M2M server 12. These keys $K_{enc}$ and $K_{res}$ and $K_{auth}$ allow establishing a secure session between a valid consumer application and the M2M server in order to enable the access to the resources of the M2M devices connected to the M2M Server—the link between the M2M Server and the M2M device is out of scope this embodiment where the M2M Server is seen as a Resource Provider FIG. 3 shows flow chart depicting a set of functions 40 that can be carried out in accordance with an another example of embodiment where the end-to-end security is implemented between the consumer application and the M2M device. In this embodiment, the M2M Server plays only the role of Policy Enforcer and Data Access Enabler. In this embodiment, the Session Keys are not encrypted by a M2M device encryption key; therefore, the M2M device shall retrieve the keys to the M2M authorization server. The set of functions 40 can be performed to use the provided securities credential to access to the resources of the M2M devices. The set of functions 40 are shown within steps 41 through 55. A description of these steps now follows.

Upon receiving an input from a user to request an access to resources of the M2M devices 10, the user device 14 launches the execution of the consumer application 18, at step 41. When the consumer application 18 is launched, at step 42, steps 22 to 27 of FIG. 2 are performed. At step 43, the consumer application 18 transmits to the M2M server 12 the access token, the authentication data and the access request elaborated in steps 22 to 27 of FIG. 2. Upon reception, the M2M server can verify, at step 44, the validity of the access token (for example by verifying its lifetime, its authenticity . . . ).

The M2M server 12 can decrypt the encrypted session data unique identifier and the request counter with the session key$_{auth}$ retrieved from the access token. The M2M server 12 may verify the integrity of the data to check that the consumer application is a valid consumer application. For that, the M2M server computes a cryptographic data of the decrypted session data. The M2M server 12 compares the computed cryptographic data to the cryptographic data of the decrypted access token.

In an embodiment, during the verifications of step 44, the M2M server 12 can check if the received request counter is greater than a previous saved request counter. If the response is yes, the M2M server 12 saves the incoming request counter and delete the previous saved. With this embodiment, an anti-replay can be implemented by the M2M server 12.

If one of the verification fails, the process flow can be closed, at step 45, and the M2M server 12 may notify the consumer application and/or the M2M authorization server that the data is tampered. If on the other hand the verification is successful, the M2M server 12 may transmit, at step 46, to the M2M device 10 the encrypted request parameter of the access request.

With the processes flow proposed by the present invention, the M2M server does not need to have knowledge of authorized consumer applications; it delegates this management to the authorization server.

In an embodiment, to retrieve the session keys $K_{enc}$ and $K_{res}$ from the M2M authorization server, the M2M device 10 authenticates to the M2M authorization server 16. For that, at step 48; the M2M device 10 is involved to provide through a channel (preferably secure), an authorization data which is known to the sole M2M device 10 and the M2M authorization server 16. This authorization data is any identifier/indicia code suitably configured to allow an authenticated access. Said authorization data can be a Personal Identification Number (or PIN), a secret data, a password, a passcode, a passphrase, a digital certificate any identification code and/or the like.

Next, upon receiving the authorization data, the authorization server 16 analyses, at step 48, whether the authorization data is the expected data. If the answer is no, i.e. when the provided data does not correspond with the expected data stored within the M2M authorization server 16, then the process flow can be closed at step 49. If the answer is yes, i.e. when the provided data corresponds with the expected data stored within the M2M authorization server 16, then the M2M authorization server 16 may notify, at step 50, to the M2M device 10 that the authentication is successful.

Next, at step 51, the M2M device 10 sends a request to the M2M authorization server to get the session keys $K_{enc}$ and $K_{enc}$. This request comprises the indexes of the session keys extracted from the decrypted access token and send in the M2M server/M2M device link. Upon received, the M2M authorization server 16 extracts from its database the session keys associated to the received indexes. The extracted session keys are sent, at step 52, to the M2M device 10 in response.

At step 53, the M2M device decrypts the request parameter with the received session request encryption key $K_{enc}$. The decrypted request parameter is processed by the M2M device 10. In result of the processing, the M2M device 10 elaborates a response accordingly. At step 54, the M2M device 10 encrypts the response with the session response encryption key $K_{res}$. The encrypted response is sent in return to the consumer application 18 through the M2M server 12.

In another embodiment, the M2M server sends to the M2M device at the same time the consumer application rights extracted from the decrypted access token. Before processing the decrypted request parameter at step 53 of FIG. 3, the M2M device verifies if the decrypted request parameter is consistent with the access rights. For instance a parameter request filtering with date selection is compatible with a GET rights, a parameter requesting a set of value is compatible a SET right but not a GET right. The compatibility checking depends on the device specification and out of scope this invention. If the response is yes, the decrypted request parameter is processed at step 53. If the response is no, the process flow can be closed and the M2M device 10 may notify the M2M server and/or the consumer application that the access requested is not authorized.

The process flow described in FIG. 3 builds an end-to-end security between the consumer application 18 and the M2M device 10. The session keys $K_{enc}$ and $K_{res}$ such as defined by the present invention provide a secure channel over which information can be transmitted securely through the consumer application 18 and over the M2M server 12 to the M2M device 10. The process flow as described allows on one hand authenticating the consumer application to the M2M server 12 and on the other hand authenticating the M2M device to the authorization server 16.

In an embodiment of the present invention, the M2M device may continuously encrypt data using the response encryption key $K_{res}$ to push it to the M2M server for storage. The M2M device provides then the encrypted data to the M2M server which runs as a (encrypted) data access enabler. The user through the consumer application can send the access request to the M2M server directly. In response, the M2M server can transmit the encrypted data to the consumer application without accessing the M2M device. The consumer application with the response encryption key stored at step 26 of FIG. 2 can decrypt the response.

The session response encryption key $K_{res}$ such as defined by the present invention provides a one-way secure channel over which information can be transmitted securely through the consumer application 18 over the access network and/or Internet to the M2M device through the M2M server. The session response encryption key $K_{res}$ such as define in by the present invention provides a possibly multi-way channel from device to one or more consumer applications. The session key $K_{auth}$ allow authenticating the consumer application, to the M2M server in order to access resources of the M2M devices.

In an embodiment, if the consumer application determine that the lifetime of the session data is reached, the consumer application 18 can generate a new session data and the process flow (that may implies new authentication of the user)—described in FIG. 2 and FIG. 3 are performed again either to renew the session request encryption key $K_{enc}$ and the response encryption key $K_{res}$ and/or the authentication key $K_{auth}$ and the access token or to maintain the keys previously generated. This choice can depend on the level of security to be reached.

In another embodiment, if the lifetime of the access token is reached the consumer application 18 can generate a new session data and request renew of the access token to the Authorization Server with the rights associated to the previous access token. The process flow described in FIG. 2 and FIG. 3 are performed again to share the generated keys in the new access token with the consumer application, the M2M server and the M2M device. In the new access token the session request encryption key $K_{enc}$, the response encryption key $K_{res}$ and/or the authentication key $K_{auth}$ are renewed or the previously generated keys are maintained. This choice can depend on the level of security to be reached. The previous access token is sent at is step 24.

In another embodiment, the clear access token comprises the session request encryption key $K_{enc}$ and the response encryption key $K_{res}$ encrypted with a key shared between the M2M authorization server and the M2M device. In this case, the M2M device does not need to connect the M2M authorization server for retrieving the session keys; it retrieves the keys by decrypting the encrypted session keys sent by the M2M server to the M2M device (preferably secure link).

In another embodiment, the access token is not encrypted and the link between the consumer application 18 and the M2M server 12 is secure at transport level for instance using protocol link SSL/TLS.

The invention is simple and easy to implement and many embodiments do not mandate usage of huge cryptography mechanism and therefore enable low cost solutions. In particular, the M2M server 12 running as Policy Enabler and the M2M device are not required to rely on server certificate which simplifies the deployment of such secure IoT system. A mutual authentication between the consumer application 18 and the M2M device 10 is not needed to ensure the confidentiality of the resources and the integrity/origin of the access request. The invention allows implementation of authorized end-to-end security between consumer application and M2M device 10 over potentially unsecure channel. Anyway, some particular embodiments—mainly the embodiment where the access token is not encrypted—the link between the (consumer) consumer application and the M2M server must be secured at transport level for insuring confidentiality of the sensitive data supplied by the access token.

The invention claimed is:

1. A method for securing machine-to-machine communications between a M2M consumer application and a M2M resource provider wherein when an access request is initiated:
   sending a securities credentials request from the M2M consumer application to a M2M authorization server,
   receiving from the M2M authorization server to the consumer application generated securities credentials which comprises an access token, session encryption keys and an authentication key,
   transmitting from the M2M consumer application the access token and an authentication message to the M2M resource provider for authenticating the consumer application,
   transmitting the access request from the M2M consumer application to the M2M resource provider, said access request comprising request parameter encrypted with the session keys to access or control resources,
   authenticating by the M2M resource provider the M2M consumer application as an authorized one from the authentication message and the content of the access token,
   retrieving by the M2M resource provider the session keys from the content of the access token,
   decrypting by the M2M resource provider the encrypted request parameter with the session keys, and
   sending, from the M2M resource provider, the encrypted response of the request parameter to the M2M consumer application.

2. The method according to claim 1, wherein the M2M resource provider is a M2M device or a M2M server.

3. The method according to claim 1, wherein the generation of the access token comprises the following steps:
   generation of a session data by the M2M consumer application, said session data uniquely identifies the current transaction between the M2M consumer application and the M2M resource provider,
   computation of a cryptographic data from the generated session data,
   adding the cryptographic data to the securities credentials request,
   the access token generated by the M2M authorization server comprises the cryptographic data of the securities credentials request, information to retrieve session keys and a generated authentication key.

4. The method according to claim 1, wherein the access token is encrypted with a key shared between the M2M authorization server and the M2M resource provider.

5. The method according the claim 3, wherein the information to retrieve the session keys comprise either index associated to the session keys in a database of the M2M authorization server, or encrypted session keys with a key shared between the M2M authorization server and the M2M resource provider.

6. The method according to claim 1, wherein the authentication of the M2M consumer application by the M2M resource provider comprises the following steps:
   encrypting the session data with the authentication key, by the M2M consumer application,
   sending the access token and the encrypted session data from the M2M consumer application to the M2M server,
   from the authentication key of the access token, decrypting the encrypted session data,
   from the decrypted session data, computing a cryptographic data,
   if the comparison of the computed cryptographic data with the cryptographic data of the access token is successful, the M2M consumer application is authenticated.

7. Method according to claim 1, wherein the authenticity of the access token is verified by the M2M resource provider either from a signature computed by the M2M authorization server or an authentication data added by the M2M authorization server to the access token.

8. The method according to claim 1, wherein the authentication data comprises an incremented value of a counter which is used to perform anti replay management, the M2M resource provider verifies if the received counter value into the authentication data is greater than a previous saved counter value, if this verification is successful the M2M resource provider saves the incoming counter value and delete the previous saved.

9. The method according to claim 1, wherein:
when the authentication of the M2M consumer application is successful, the M2M resource provider authenticates to the M2M authorization server,
If the authentication is successful, retrieving the session keys.

10. The method according to claim 1, wherein the access request comprises also the session data encrypted with the session authentication key and the access token.

11. The method according to claim 1, wherein a M2M device continuously encrypts data with the session keys to push the data to the M2M resource provider for storage.

12. The method according to claim 1, wherein the access token comprises the resource unique identifier (URL) and the list of authorized queries parameters by the M2M consumer application, if the encrypted request parameter is in the list of authorized access, the encrypted query parameter is processed by the M2M resource provider.

13. The method according to claim 1, wherein during the authentication of the M2M consumer application by the M2M server a lifetime of the access token is verified.

14. The method according to claim 13, wherein when the lifetime of the access token is reached
generation of respectively a new session data and/or a new access token,
the session keys and/or the authentication key are renewed or maintained.

15. A M2M communications system, comprising a consumer application, said consumer application being configured to communicate with a M2M resource provider across an access network, wherein access request messages transiting between the consumer application and the M2M device during this communication are secured by a M2M authorization server wherein:
the M2M consumer application is programmed to send a securities credentials request from the M2M consumer application to a M2M authorization server,
the M2M consumer application is programmed to receive from the M2M authorization server generated securities credentials which comprises an access token, session encryption keys and an authentication key,
the M2M consumer application is programmed to transmit from the M2M consumer application the access token and an authentication message to the M2M resource provider for authenticating the consumer application,
the M2M consumer application is programmed to transmit the access request from the M2M consumer application to the M2M resource provider, said access request comprising request parameter encrypted with the session keys to access or control resources,
the M2M resource provider is programmed to authenticate the M2M consumer application as an authorized one from the authentication message and the content of the access token,
the M2M resource provider is programmed to retrieve the session keys from the content of the access token,
the M2M resource provider is programmed to decrypt the encrypted request parameter with the session keys, and
the M2M resource provider is programmed to send the encrypted response of the request parameter to the M2M consumer application.

16. The system according to claim 15 wherein the M2M resource provider is a M2M device or a M2M server.

17. The system according to claim 15 wherein:
the M2M consumer application is further programmed to generate a session data, said session data uniquely identifies the current transaction between the M2M consumer application and the M2M resource provider,
the M2M consumer application is further programmed to compute a cryptographic data from the generated session data,
the M2M consumer application is further programmed to add the cryptographic data to the securities credentials request, and
wherein the access token generated by the M2M authorization server comprises the cryptographic data of the securities credentials request, information to retrieve session keys and a generated authentication key.

18. The system according to claim 15 wherein the access token is encrypted with a key shared between the M2M authorization server and the M2M resource provider.

19. The system according to claim 18 wherein the information to retrieve the session keys comprise either index associated to the session keys in a database of the M2M authorization server, or encrypted session keys with a key shared between the M2M authorization server and the M2M resource provider.

20. The system according to claim 15 wherein the resource provider is programmed to authenticate the M2M consumer application by the M2M resource provider by:
encrypting the session data with the authentication key, by the M2M consumer application,
sending the access token and the encrypted session data from the M2M consumer application to the M2M server,
from the authentication key of the access token, decrypting the encrypted session data,
from the decrypted session data, computing a cryptographic data,
if the comparison of the computed cryptographic data with the cryptographic data of the access token is successful, the M2M consumer application is authenticated.

* * * * *